March 22, 1932.  J. J. SHIVELY  1,850,571
DIAPHRAGM PACKING
Filed Aug. 6, 1926

INVENTOR.
JOHN J. SHIVELY.
BY
ATTORNEY.

Patented Mar. 22, 1932

1,850,571

UNITED STATES PATENT OFFICE

JOHN J. SHIVELY, OF BROOKVILLE, PENNSYLVANIA

DIAPHRAGM PACKING

Application filed August 6, 1926. Serial No. 127,582.

This invention relates to diaphragm packings, as, for example, for use in compressors for refrigerating apparatus and like machinery.

The requirements of refrigerating machinery are severe, and proper operation depends upon tightness of the system. It is accordingly essential that in compressors, or like machinery operable under similar conditions, no leakage must occur either of air inwardly or of refrigerant outwardly, the leakage of air inwardly reducing the efficiency of the system and the leakage outwardly causing loss of the refrigerant. It is, therefore, necessary that, at the point where the crank shaft projects through the casing of the compressor, an effective packing or seal be provided which will prevent leakage into or from the casing about the shaft.

The general purpose of the present invention is to provide an improved diaphragm packing or seal construction for use about shafts in such compressors or other machinery as operate under the same or similar conditions.

In particular the invention is directed to an improved seal construction capable of easy installation and removal, operable with reduced friction and wear, designed to provide rapid elimination of what heat is developed by the friction and adapted to make an effective liquid seal, the liquid of which is adapted to freely flow between and lubricate the friction surfaces.

The foregoing and other objects are obtained by the diaphragm packing illustrated in the accompanying drawings and described below. It is to be understood that the invention is not limited to the specific form thereof shown and described.

Figure 1:
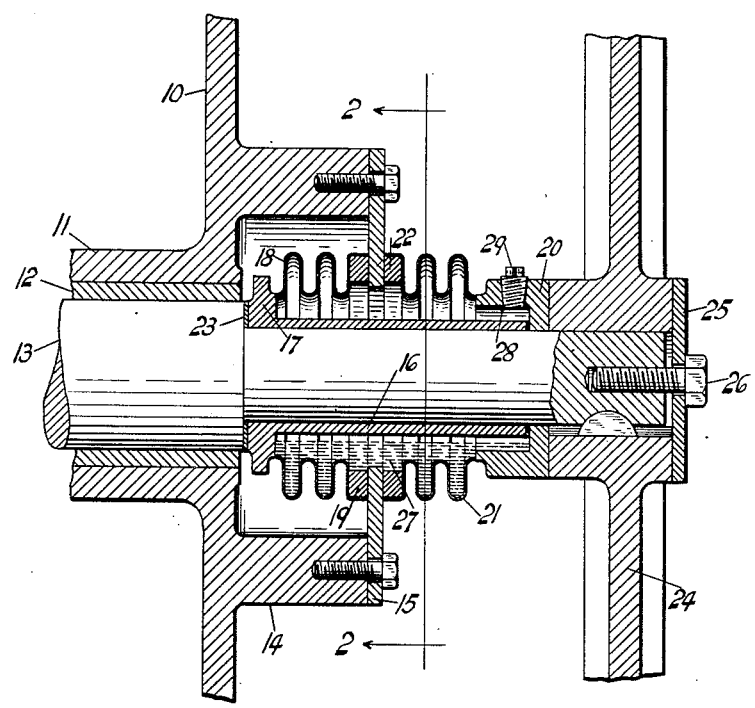
Figure 2:
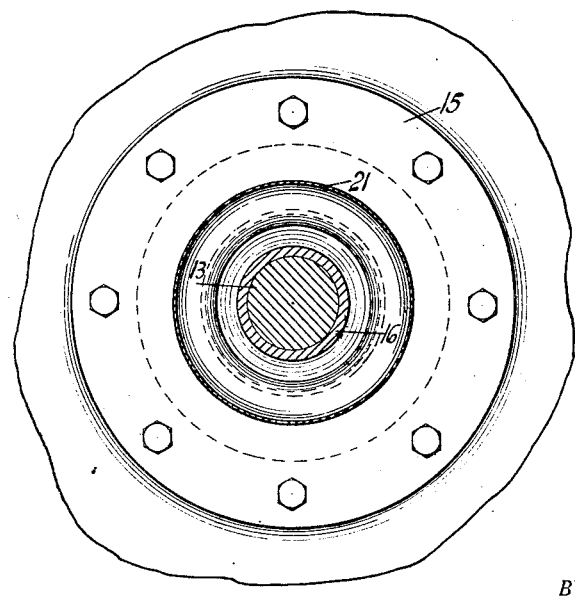

Of the accompanying drawings:

Figure 1 is a diametral, sectional view of a crank shaft bearing in a compressor casing and illustrating a diaphragm packing embodying the invention; and Figure 2 is a section on line 2—2 of Figure 1.

Referring to the drawings, 10 indicates the casing of a compressor formed with crank shaft bearings as at 11, having the usual bushing 12 therein and in which is journaled a crank shaft 13. Formed on casing 10 is an annular extension 14 providing a housing for one section of a diaphragm packing embodying the invention and onto the end of which is secured a centrally apertured plate 15 against which the sealing action of the packing takes place.

The packing construction includes sleeve 16 on shaft 13, the sleeve being formed with a flange 17 at its inner end to which is secured one end of a longitudinally expansible, resilient corrugated tube or diaphragm 18 assembled so as to be compressed to urge a packing ring 19 secured to the other end thereof against the inner face of plate 15, the engaging surfaces of the ring and plate being ground smooth to reduce friction. Arranged on the shaft 13, outside of housing 14, is a collar 20 formed with an inwardly directed flange to the inner end of which is secured a diaphragm 21 similar to diaphragm 18 and adapted to urge a packing ring 22 similar to ring 19 against the outer face of plate 15, the contacting surfaces of plate 15 and ring 22 also being ground smooth.

The packing above described is preferably secured to the shaft to rotate therewith and to compress the outer diaphragm by clamping it to the shaft between a shoulder 23 thereon and fly wheel 24 urged against collar 20 by a pressure plate 25 operable by a cap screw 26 threaded into an end of shaft 13. Other means for clamping the packing to the shaft may be employed.

A chamber 27 is thus provided within the packing which may be wholly or partially filled with a sealing liquid such as oil which is adapted also to act as a lubricant. An inlet for filling this chamber may be provided through member 20 at 28, the inlet being provided with a removable closure 29.

In operation, the seal rotates with the shaft and the oil therein is forced outwardly by centrifugal action between the surface of rings 19 and 22 and plate 15. In this device the thrusts due to the two diaphragms exactly balance, and the seal will resist pressure in either direction with exactly equal effectiveness. The heat of what friction that is developed is distributed through the oil in the seal, whence it passes through the thin corrugated walls and is radiated from the outside corrugated surface, thus keeping down the temperature of the relatively moving surfaces preventing undue wear and possible scoring. The radiating action is especially effective, due to the fact that one diaphragm is exposed to the outer air.

Modifications of the invention may be resorted to without departing from the spirit thereof or the scope of the appended claims.

What is claimed is:

1. The combination with a casing and a shaft projecting through said casing, said casing having a sleeve extension about said shaft, of a seal about the shaft, comprising a member secured on the end of said extension having an opening larger than the shaft through which member the shaft projects, sealing rings urged against the opposite sides of said member, diaphragms secured to the shaft to which said rings are connected and by which said rings are yieldingly urged against said member, one of said rings and diaphragms being within the extension, the interiors of the diaphragms being in communication through the member, and a sealing liquid in said diaphragms, said liquid being adapted to lubricate the engaged surfaces of said rings with said member.

2. The combination with a casing and a shaft projecting through the casing, said casing having means therein providing an aperture larger than the shaft through which the shaft projects, of a seal secured to said shaft and cooperating with said means, said seal comprising rings adapted to be urged against the opposite sides of said means about the aperture, and resilient diaphragms secured at one end to the shaft and at their other ends respectively to said rings for urging the rings against said means, said diaphragms, rings and said means defining a chamber about said shaft, said chamber containing a liquid providing a liquid seal.

JOHN J. SHIVELY.